F. H. SMITH.
BLOW-OFF COCK.
APPLICATION FILED SEPT. 3, 1912.
1,070,741.
Patented Aug. 19, 1913.
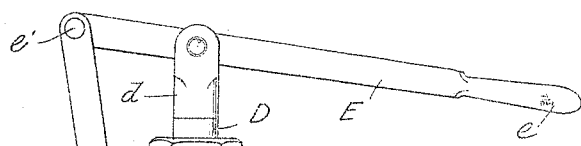
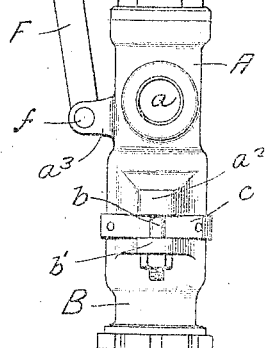
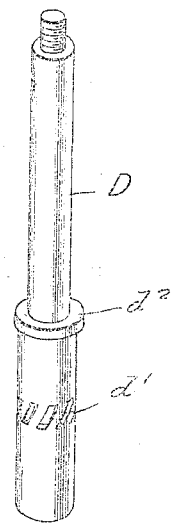
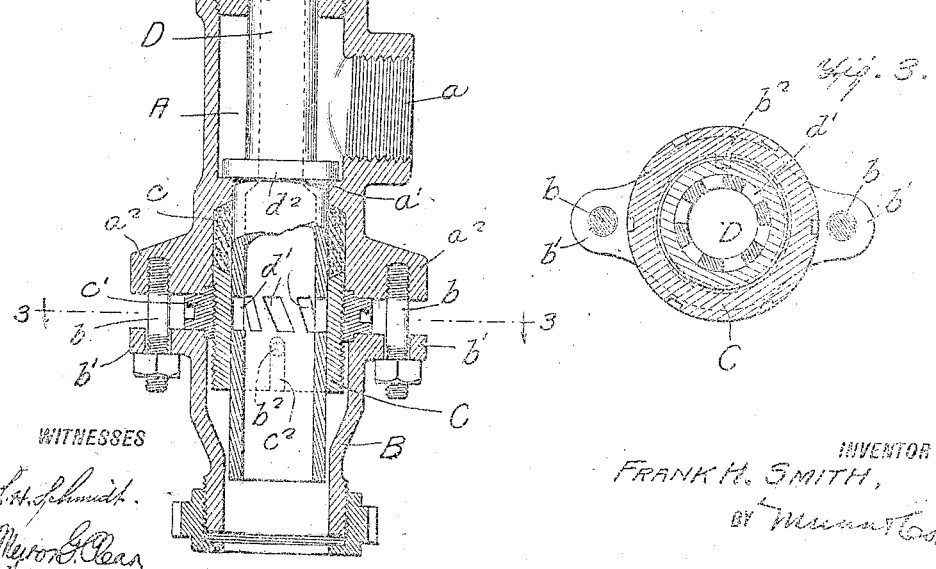
WITNESSES
INVENTOR
FRANK H. SMITH,
BY Munn & Co.
ATTORNEYS

UNITED STATES PATENT OFFICE.

FRANK H. SMITH, OF PARSONS, KANSAS, ASSIGNOR OF ONE-HALF TO SAMUEL H. JONES, OF PARSONS, KANSAS.

BLOW-OFF COCK.

1,070,741.

Specification of Letters Patent.

Patented Aug. 19, 1913.

Application filed September 3, 1912. Serial No. 718,252.

*To all whom it may concern:*

Be it known that I, FRANK H. SMITH, a citizen of the United States, and a resident of Parsons, in the county of Labette and State of Kansas, have invented a new and useful Improvement in Blow-Off Cocks, of which the following is a specification.

My present invention relates to blow-off cocks, my object being to provide a construction which will effectively perform the functions usually incident to blow-off cocks without the necessity of ground-joints and other parts which ordinarily require frequent and careful machining.

Broadly, the improvements incident to my present invention reside in the provision of a hollow valve stem carrying a valve member adapted for engagement with a seat located within the valve casing below its inlet, the lower portion of the valve stem being provided with apertures through its wall and being surrounded by a stuffing box, formed within the casing below its said seat and including a gland and certain other parts by which the gland may be adjusted from the exterior of the casing without requiring the removal of other parts.

With the above in mind, I have shown the practical embodiment of my invention in the accompanying drawing, which forms a part of this specification, and in which—

Figure 1 is a side elevation of my improved blow-off cock. Fig. 2 is a transverse vertical section taken therethrough. Fig. 3 is a horizontal section taken therethrough substantially on the line 3—3 of Fig. 2, and Fig. 4 is a perspective view of the valve stem removed.

Referring now to these figures, the casing A is provided with an internally threaded side opening $a$ for connection with the inlet pipe, and has an upper stuffing box A' threaded in connection with the top thereof and removable therefrom. At a point below its before mentioned side inlet opening $a$, the casing A is provided with an inwardly projecting circular rib $a'$ which forms a valve seat, and the lower end of the casing is provided with side extensions $a^2$ from which project the threaded studs $b$ adapted to extend through side projections $b'$ of the lower discharge fitting B, for the purpose of removably locking said discharge fitting in position adjacent said lower casing end.

The lower portion of the casing A is provided with a stuffing box which consists of packing $c$ disposed in the space immediately below its valve seat $a'$ and adjustably compressed by means of a gland C, the latter being threaded upon its outer surface and engaged by an adjusting ring $c'$ mounted in the space between the lower end of the casing and the upper end of the discharge fitting B.

Mounted vertically through the casing is the valve-stem D, the upper end of which is provided with a removable slotted member $d$, and the lower portion of which is provided with a circular series of apertures $d'$ which communicate with its longitudinal bore as clearly indicated in Figs. 2 and 3. Intermediate its ends, and at a point above the series of apertures $d'$, the valve stem is provided with a circular flange $d^2$, constituting a valve and adapted, when the valve is closed, to rest upon the valve seat $a'$ of the casing, substantially in the position shown in Fig. 2.

An operating lever E has an intermediate pivotal connection with the upper slotted stem member $d$ of the valve stem, and is provided with a handle $e$ at one end and is pivotally connected at $e'$ at its opposite end, to the upper end of a generally vertical link F, the latter of which is in turn pivoted at its lower end, at $f$, to a projection $a^3$ of the casing A. Thus, in order to open the valve when in the position shown in Fig. 2, it is necessary to raise the lever E and thus raise the valve stem D, to a point wherein the apertures $d'$ of the valve stem extend above the valve seat $a'$ of the casing, whereby the fluid may pass into the casing through its inlet $a$ and through the stem openings $d'$ and thence through the bore of the valve stem and downwardly through the discharge fitting B.

It will be noted that the discharge fitting B is nonrotatably connected to the casing A and is provided with an inwardly extending lug $b^2$ which slidably fits within a vertical slot $c^2$ in the lower portion of the adjustable gland C, whereby the latter will be prevented from rotation and thus forced to move longitudinally when its adjusting ring $c'$, which is provided with peripheral apertures, is rotated, for instance by a spanner wrench, from the exterior of the casing. It will be further noted that this construction clearly obviates the necessity of ground-joints or other parts requiring frequent cleaning and careful machining, and may be readily maintained in a non-leaking condition by infrequent adjustment of the gland C.

It should be understood that the valve stem and packing $c$ surrounding the valve stem constitutes the main closure means, and that the valve $d^2$ and seat $a'$ are supplemental thereto and may be dispensed with entirely. So long as the openings $d'$ of the valve stem are disposed within or below the packing $c$, and the gland C properly adjusted, there can be no leak.

I claim:—

1. A blow off cock comprising a casing formed in upper and lower portions, the latter of which is open at its lower end, and the former of which is provided with a side opening, a hollow stem operating in the casing and having openings in its wall, a stuffing box arranged in the upper casing portion below its side opening and surrounding the said stem, said stuffing box embodying an adjustable gland, and a nut rotatable in the space between the casing portions, said nut being accessible from the exterior of the casing and having threaded engagement with the gland, and means whereby to prevent rotation of the gland and cause longitudinal movement thereof when the nut is rotated.

2. A blow-off cock comprising a casing having a side inlet and a valve seat below the inlet, and further provided with a lower discharge portion secured in spaced relation thereto, a hollow stem operating in the casing and having an intermediate member constituting a valve for engagement with the casing seat, and also having openings through its wall below its said valve member, a stuffing box arranged in the casing below its seat and surrounding the lower portion of the said stem, said stuffing box embodying an adjustable gland, and a nut rotatable in the space between the casing and its spaced lower discharge portion, said nut being accessible from the exterior of the casing and engaging the said gland for the purpose of adjusting the latter.

3. A blow-off cock comprising a casing having a side inlet and a valve seat below the inlet, and also provided with a lower discharge portion secured in spaced relation thereto, a hollow stem operating in the casing and having an intermediate member constituting a valve for engagement with the valve seat, and further provided with openings through its wall below its said valve member, a stuffing box arranged in the casing below its seat and surrounding the lower portion of said stem, and embodying an externally threaded gland provided with a longitudinal slot, a stud formed on a portion of the casing and projecting within the said gland slot whereby to prevent rotation of the gland, and a nut rotatable in the space adjacent the discharge portion and having internal threads engaging the exterior of the gland, and adapted upon its rotation to affect an adjustment of the gland.

FRANK H. SMITH.

Witnesses:
O. C. HOLMES,
GEO. YOUNG.